J. A. UNDERWOOD.
Grain Drill.
No. 36,739.
Patented Oct. 21, 1862.
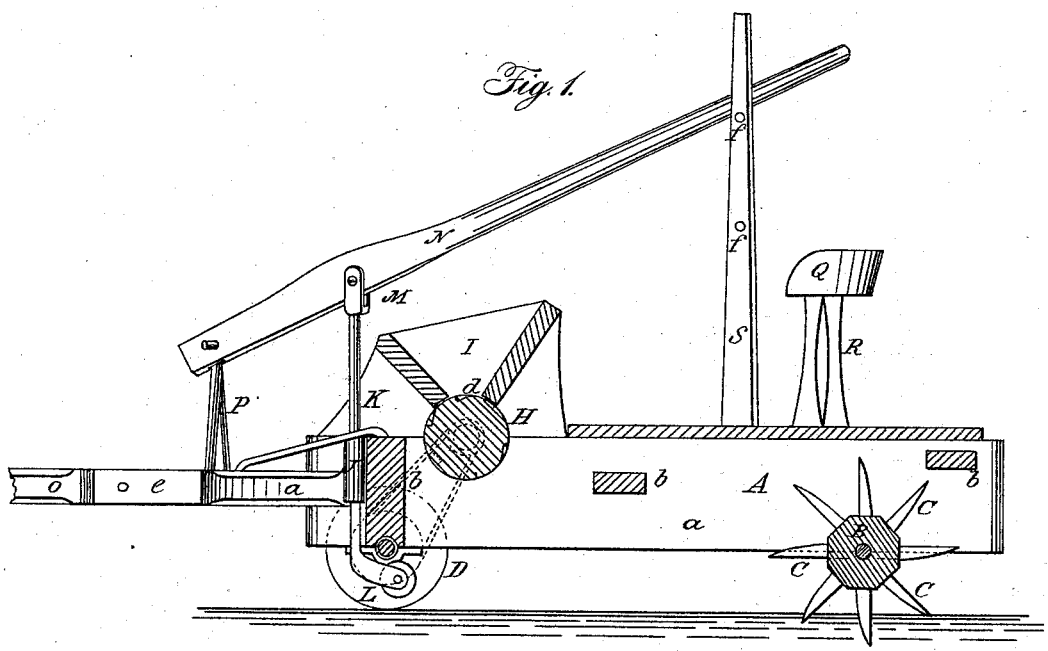
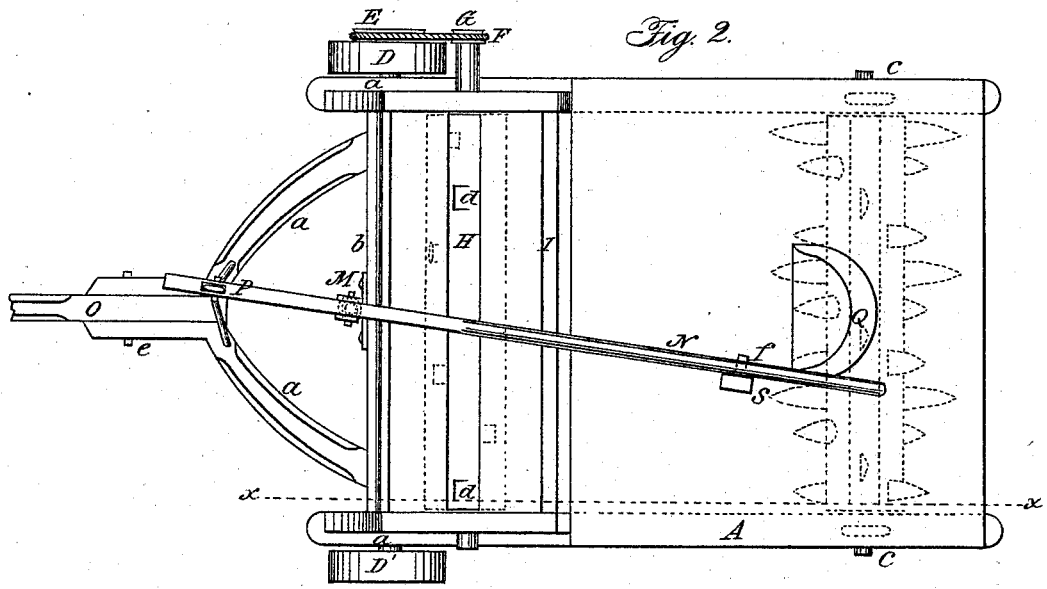
Witnesses:
J W Coombs
G W Reed
Inventor:
J. A. Underwood
per Munn & Co.
Att'ys

UNITED STATES PATENT OFFICE.

J. A. UNDERWOOD, OF GRAND RIVER, IOWA.

IMPROVEMENT IN COMBINED HARROW AND SEED-DRILL.

Specification forming part of Letters Patent No. 36,739, dated October 21, 1862.

*To all whom it may concern:*

Be it known that I, J. A. UNDERWOOD, of Grand River, in the county of Wayne and State of Iowa, have invented a new and Improved Combination of Harrow and Seed-Drill; and I do hereby declare that the following is a full, clear, and exact description of the same, reference being had to the annexed drawings, making a part of this specification, in which—

Figure 1 is a side sectional view of my invention, taken in the line *x x*, Fig. 2; Fig. 2, a plan or top view of same.

Similar letters of reference indicate corresponding parts in the two figures.

The object of this invention is to obtain an implement by which seed may be sown broadcast or in drills, and at the same time properly covered in the earth by a rotary harrow, the parts being so arranged that the seed-distributing device may be readily rendered inoperative, when necessary—as in turning at the end of a field—and the seed-distributing and harrowing device made to operate simultaneously by the forward movement of the machine.

To enable those skilled in the art to fully understand and construct my invention, I will proceed to describe it.

A represents a rectangular frame, which is formed of two side pieces, *a a*, connected by transverse bars *b*, and B is a shaft, the journals *c* of which are fitted in bearings at the back part of the frame A. The shaft B extends the whole width of the frame A, and it may be of polygonal form, provided with radial shares or teeth C to serve as harrows or pulverizers. The teeth or shares may be arranged in a spiral line or lines around the shaft B, and they may be of any proper form. The ordinary cultivator-tooth form, however, would probably be as good as any.

The front part of the frame A, when the machine is at work, is supported by wheels D D'. One of these wheels, D, has a pulley, E, attached to its outer side, and around this pulley a band, F, passes, said band also passing around a pulley, G, at one end of a cylinder, H, which cylinder is parallel with the shaft B, and is at the bottom of a seed-box, I. The cylinder H has holes or seed-cells *d* made in its periphery.

At the front end of the frame A there is secured vertically a socket or guide, J, in which a rod, K, is fitted or placed. This rod K has a small wheel, L, at its lower end, and the upper end of said rod is fitted in a clasp, M, which is attached to a lever, N, the rod K being allowed to turn freely in the clasp, like a swivel, to admit of the wheel L turning and performing the function of a caster-wheel.

To the front part of the frame A there are attached two hounds, *a a*, between which the draft-pole O is placed and secured by the usual bolt, *e*. The front end of the lever N is connected to the hounds *a a* by a rod, P.

Q is the driver's seat, which is attached to the upper end of an upright, R, on the back part of frame A, and S is an upright which is secured to frame A directly in front of seat Q, said upright having pins *f* attached to retain or hold down the back part of lever N when necessary.

The operation of the machine is as follows: The seed-box I is supplied with a requisite quantity of seed, and when the machine is at work the wheels D D' rest upon the ground. As the machine is drawn along the cylinder H is rotated by the band F, and the seed thereby distributed from the seed-box, and the harrows or teeth C of the shaft B pulverize the earth and cover the seed, the rotation of the shaft B being due to the penetration of the shares or teeth C into the earth in connection with the forward movement of the machine. In turning the machine at the end of rows, or at other times when the seed-distributing device should be inoperative, the driver simply depresses the back end of the lever N and places it under a pin of the upright S. This adjustment of the lever N causes the caster-wheel L to bear upon the ground and support the front part of the frame A, the wheels D D' being thereby elevated above the ground and the seed-distributing cylinder H consequently rendered inoperative. The whole arrangement, it will be seen, is extremely simple and efficient, the parts being under the perfect control of the operator.

I do not claim broadly the employment or use of a rotary harrow or digger, for that has been previously used; nor do I claim a rotating seed-distributing cylinder, for that has also been used; but I do claim as new and desire to secure by Letters Patent—

The combination of the adjustable wheel L, swivel-rod K, and lever M with the wheels D, seed-box I, seed-cylinder H, and rotary harrow B, all in the manner and for the purpose herein shown and described.

J. A. UNDERWOOD.

Witnesses:
H. C. GLENDENNING,
I. M. SULLIVAN.